United States Patent
Kitagawa

(10) Patent No.: US 7,220,465 B2
(45) Date of Patent: May 22, 2007

(54) LIQUID CRYSTAL COMPOSITION, ANTHRAQUINONE COMPOUND AND LIQUID CRYSTAL DEVICE EMPLOYING THE COMPOSITION

(75) Inventor: Hirotaka Kitagawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 152 days.

(21) Appl. No.: 10/984,849

(22) Filed: Nov. 10, 2004

(65) Prior Publication Data
US 2005/0173673 A1 Aug. 11, 2005

(30) Foreign Application Priority Data
Nov. 11, 2003 (JP) ............................. 2003-380669

(51) Int. Cl.
*C09K 19/60* (2006.01)
*C09B 1/16* (2006.01)
*C09B 1/56* (2006.01)

(52) U.S. Cl. ..................... 428/1.1; 428/1.3; 252/299.1; 552/235

(58) Field of Classification Search ................. 428/1.1, 428/1.3; 252/299.1; 349/165; 552/235
See application file for complete search history.

(56) References Cited

U.S. PATENT DOCUMENTS

| | | | | |
|---|---|---|---|---|
| 4,405,211 A | * | 9/1983 | Harrison et al. | ............ 349/165 |
| 6,033,742 A | * | 3/2000 | Iwanaga et al. | ............ 428/1.31 |
| 6,197,223 B1 | | 3/2001 | Weaver et al. | |
| 6,787,658 B2 | * | 9/2004 | Cyr et al. | .................... 552/223 |
| 6,870,063 B2 | * | 3/2005 | Cyr et al. | .................... 552/235 |

FOREIGN PATENT DOCUMENTS

| | | |
|---|---|---|
| JP | 59-27956 | 2/1984 |
| JP | 4-6223 | 2/1992 |

\* cited by examiner

*Primary Examiner*—Shean C Wu
(74) *Attorney, Agent, or Firm*—Buchanan Ingersoll & Rooney PC

(57) ABSTRACT

A novel liquid crystal composition is disclosed. The composition comprises at least one liquid crystal and at least one compound represented by a formula (1), wherein $R^1$ and $R^2$ respectively represent an optionally substituted aryl group and optionally substituted heteroaryl group; $R^7$ and $R^8$ respectively represent an optionally substituted aryl group; $R^3$, $R^4$, $R^5$ and $R^6$ respectively represent a hydrogen atom or a substituent. A novel liquid crystal device comprising a pair of substrates and the composition disposed between them is also disclosed

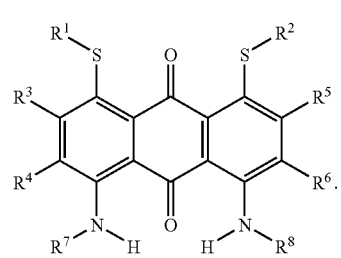

Formula (1)

14 Claims, 1 Drawing Sheet

LIQUID CRYSTAL COMPOSITION, ANTHRAQUINONE COMPOUND AND LIQUID CRYSTAL DEVICE EMPLOYING THE COMPOSITION

TECHNICAL FIELD

The present invention relates to a liquid crystal composition and a liquid crystal device employing the composition, which is especially suitable for a guest-host-type liquid crystal device. The present invention also relates to anthraquinone compounds useful as a dichroic dye.

RELATED ART

There are known various types of liquid crystal devices. Among them, liquid crystal displays employing a guest-host-mode are capable of bright display, and therefore are expected as a reflection mode display. A guest-host-mode liquid crystal device has a cell filled with a liquid crystal composition comprising liquid crystal as a host and at least one dichroic dye dissolved therein as a guest. When a voltage is applied to the cell sufficient to rotate the liquid crystal molecules, the dye molecules rotate along with the liquid crystal molecules and allow changing of light absorption by the cell to thereby effect display. Dichroic dyes employed in guest-host-mode liquid crystal devices are required to have a proper absorption property, a high order parameter, a high solubility, a high durability and so forth.

Various anthraquinone derivatives have been studied. An anthraquinone dye, having amino groups and alkylthio groups, shown below is disclosed in JPA No. 1984-27956 (the term "JPA" as used herein means a "Kohkai Tokkyo Koho (unexamined published Japanese patent application)") or JPB No. 1992-6223 (the term "JPB" as used herein means a "Kohkoku Tokkyo Koho (examined published Japanese patent application)").

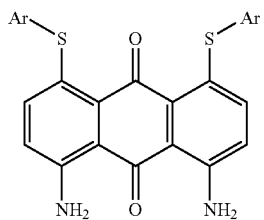

And a compound shown below is disclosed in U.S. Pat. No. 6,197,223B1.

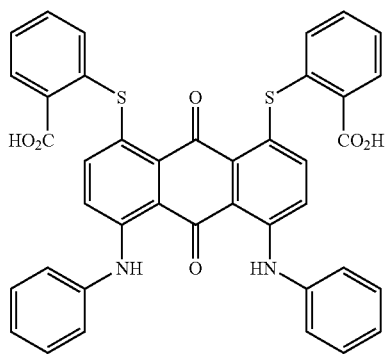

SUMMARY OF THE INVENTION

One object of the present invention is to provide a liquid crystal device employing an anthraquinone dye, which gives a sufficient high order parameter and a proper absorption property in red color region, and therefore delivering a superior display performance. Another object of the present invention is to provide a liquid crystal composition useful for liquid crystal devices, especially for a guest-host mode, delivering a superior display performance. Another object of the present invention is to provide a compound, giving a sufficient high order parameter and a proper absorption property in red color region, useful as a dichroic dye.

From one aspect, the present invention provides a composition comprising at least one liquid crystal and at least one compound represented by a formula (1):

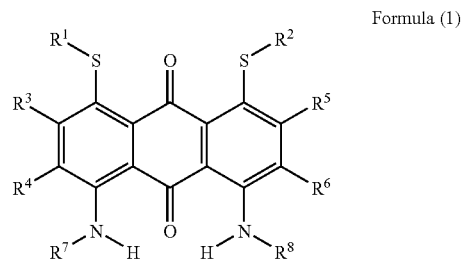

Formula (1)

wherein $R^1$ and $R^2$ respectively represent an optionally substituted aryl group or an optionally substituted heteroaryl group; $R^7$ and $R^8$ respectively represent an optionally substituted aryl group and $R^3$, $R^4$, $R^5$ and $R^6$ respectively represent a hydrogen atom or a substituent.

As one embodiment of the present invention, the composition wherein $R^1$ and $R^2$ are respectively selected from a group represented by a formula (a):

—(B$^1$)-{(Q)$_r$-(B$^2$)}$_n$—C$^1$    Formula (a)

wherein $B^1$ and $B^2$ respectively represent an optionally substituted arylene group or an optionally substituted heteroarylene group, Q is a divalent linking group, $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group, r is 0 or 1, n is an integer of 1 to 3 and two of Q or two of $B^2$ may be identical to or different each other when n is 2 or 3; is provided.

From another aspect, the present invention provides a liquid crystal device comprising a pair of electrodes and a liquid crystal layer disposed between the electrodes wherein the liquid crystal layer comprises a composition comprising at least one compound represented by a formula (1):

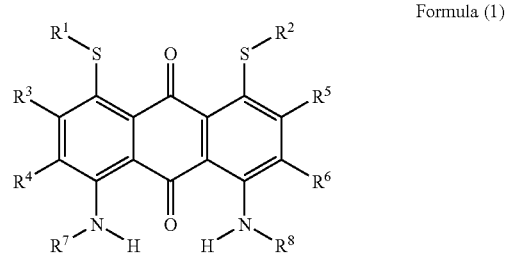

Formula (1)

wherein $R^1$ and $R^2$ respectively represent an optionally substituted aryl group or an optionally substituted heteroaryl group; $R^7$ and $R^8$ respectively represent an optionally substituted aryl group and $R^3$, $R^4$, $R^5$ and $R^6$ respectively represent a hydrogen atom or a substituent;

and liquid crystal.

As one embodiment of the present invention, the liquid crystal device wherein $R^1$ and $R^2$ are respectively selected from a group represented by a formula (a):

Formula (a)

wherein $B^1$ and $B^2$ respectively represent an optionally substituted arylene group or an optionally substituted heteroarylene group, Q is a divalent linking group, $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group, r is 0 or 1, n is an integer of 1 to 3 and two of Q or two of $B^2$ may be identical to or different each other when n is 2 or 3; is provided.

From another aspect, the present invention provides a compound represented by a formula (2):

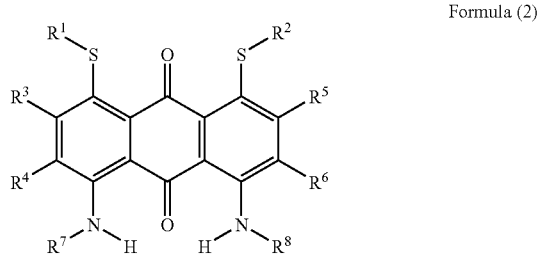

Formula (2)

wherein $R^1$ and $R^2$ respectively represent an optionally substituted aryl group or an optionally substituted heteroaryl group; $R^7$ and $R^8$ respectively represent an optionally substituted aryl group; $R^3$, $R^4$, $R^5$ and $R^6$ respectively represent a hydrogen atom or a substituent and at least one of $R^1$ and $R^2$ is selected from a group represented by a formula (a):

Formula (a)

wherein $B^1$ and $B^2$ respectively represent an optionally substituted arylene group or an optionally substituted heteroarylene group, Q is a divalent linking group, $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group, r is 0 or 1, n is an integer of 1 to 3 and two of Q or two of $B^2$ may be identical to or different each other when n is 2 or 3.

DETAILED DESCRIPTION OF THE INVENTION

Figure 1:
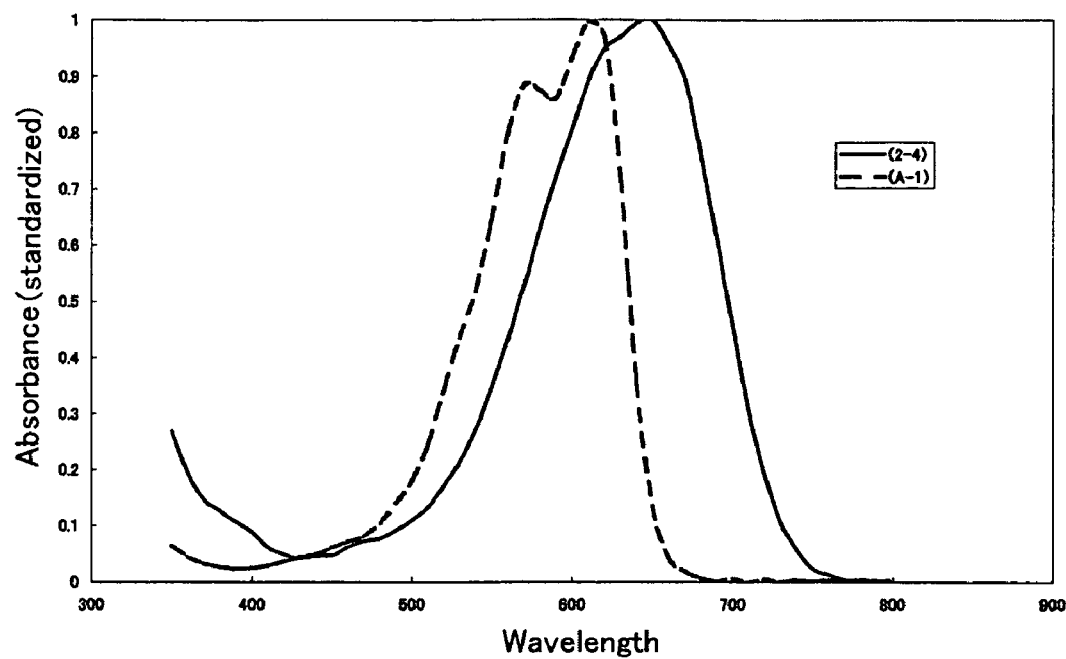
FIG. 1 shows wavelength-absorbance correlations of a compound of the present invention and a comparative compound.

Hereafter, the present invention will be explained in detail. In the specification, ranges indicated with "to" mean ranges including the numerical values before and after "to" as the minimum and maximum values.

Japanese Patent Application No. 2003-380669 is incorporated herein by reference.

The present invention relates to a liquid crystal composition comprising at least one compound represented by a formula (1) or a formula (2), occasionally referred to as "a compound of the present invention" or "a dye of the present invention". The formula (2) is identical to the formula (1) when at least one of $R^1$ and $R^2$ is a group represented by a formula (a) described below.

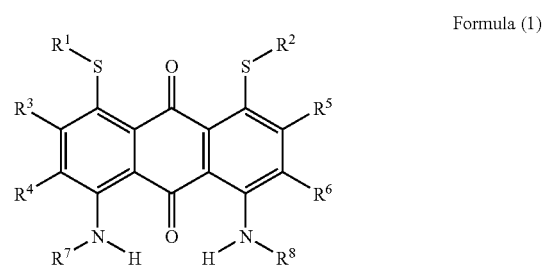

Formula (1)

In the formula, $R^1$ and $R^2$ respectively represent an optionally substituted aryl group and an optionally substituted heteroaryl group; $R^7$ and $R^8$ respectively represent an optionally substituted aryl group; and $R^3$, $R^4$, $R^5$ and $R^6$ respectively represent a hydrogen atom or a substituent.

The aryl group represented by $R^1$ or $R^2$ is desirably selected from $C_{6-30}$ aryl groups such as phenyl or naphthyl. The heteroaryl group represented by $R^1$ or $R^2$ is a monovalent residue of a heteroaryl ring consisting of at least one carbon atom and at least one heteroatom selected from a nitrogen atom, oxygen atom and sulfur atom. Preferred examples of the heteroaryl group include pyridyl, thienyl, furyl, morpholino, tetrahydro furfuryl, quinolyl, thiazolyl, benzothiazolyl, oxazolyl, benzoxazolyl, imidazolyl and benzimidazolyl. The aryl group or the heteroaryl group may carry a substituent. The substituent is desirably selected from an alkyl group, a cycloalkyl group, an aryl group or a heteroaryl group.

$R^1$ and $R^2$ are desirably selected from a substituted or unsubstituted aryl group and more desirably selected from phenyl substituted with an alkyl group or an aryl group. At least one of $R^1$ and $R^2$ is much more desirably the group represented by a formula (a) shown below. Both of R and R 2 may be selected from the group represented by the formula (a).

Formula (a)

In the formula, $B^1$ and $B^2$ respectively represent an optionally substituted arylene group or an optionally substituted heteroarylene group, Q is a divalent linking group, $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group, r is 0 or 1, n is an integer of 1 to 3 and two of Q or two of $B^2$ may be identical to or different each other when n is 2 or 3.

In the formula (a), $B^1$ and $B^2$ respectively represent an optionally substituted arylene group or an optionally substituted heteroarylene group. The arylene group represented by $B^1$ or $B^2$ is desirably selected from $C_{6-20}$ arylene group. Preferred examples of the arylene group include divalent residues of substituted or unsubstituted benzene, substituted or unsubstituted naphthalene and substituted or unsubstituted anthracene. Divalent residues of benzene or substituted benzene are more preferred and 1,4-phenylene is especially preferred. The heteroarylene group represented by $B^1$ or $B^2$ is desirably selected from $C_{1-20}$ heteroarylene group. Preferred examples of the heteroarylene group include divalent residues of pyridine, quinoline, isoquinoline, pyrimidine, pyrazine, thiophene, furan, oxazole, thiazole, imidazole, pyrazole, oxadiazole, thiadiazole, triazole and heteroaryl ring condensed one kind of rings or two or more kinds of rings selected therefrom.

The divalent cyclic group represented by $B^1$ or $B^2$ may carry a substituent, and examples of the substituent are same as those exemplified below as examples of a substituent respectively represented by $R^3$ to $R^6$.

In the formula (a), Q is a divalent linking group. Q may consist of at least one atom selected from carbon atom, nitrogen atom, oxygen atom or sulfur atom. Examples of the divalent linking group include $C_{0-30}$ divalent linking groups consisting of one or a combination of two or more selected from a $C_{1-20}$ alkylene group such as methylene, ethylene, propylene, butylene, pentylene or cyclohexyl-1,4-diyl, a $C_{2-20}$ alkenylene group such as ethenylene, a $C_{2-20}$ alkynylene such as ethynylene, an amido group (—NH—), an ether group (—O—), an ester group (—COO—), a sulfonamide group (—SO$_2$NH—), a sulfonate group (—SO$_3$—), a ureido group (—NH—CO—NH—), a sulfonyl group (—SO$_2$—), a sulfinyl group (—SO—), a thioether group (-s-), a carbonyl group (—CO—), —NR— (where R is a hydrogen atom, an alkyl group or an aryl group), an azo group (—N$_2$—), an azoxy group (—N$_2$(O)—) and a divalent heterocyclic group such as piperazine-1,4-diyl. Q is desirably an alkylene group, an alkenylene group, an ether group, a thioether group or a combination thereof. Q may carry a substituent, and examples of the substituent are same as those exemplified below as examples of the substituent respectively represented by $R^3$ to $R^6$.

In the formula (a), $C^1$ represents an optionally substituted alkyl group, an optionally substituted cycloalkyl group, an optionally substituted alkoxy group, an optionally substituted alkoxycarbonyl group, an optionally substituted acyl group or an optionally substituted acyloxy group. Preferred examples of $C^1$ include a $C_{1-20}$, desirably $C_{1-15}$ and more desirably $C_{1-12}$ alkyl group such as methyl, ethyl, propyl, i-propyl, butyl, i-butyl, s-butyl, t-butyl, pentyl, t-pentyl, hexyl, heptyl, octyl, cyclohexyl, 4-butylcyclohexyl, 4-pentylcyclohexyl, trifluoromethyl or benzyl; a $C_{1-20}$, desirably $C_{1-12}$ and more desirably $C_{1-8}$ alkoxy group such as methoxy, ethoxy, 2-methoxyethoxy or 2-phenylethoxy; a $C_{1-20}$, desirably $C_{2-12}$ and more desirably $C_{2-8}$ acyloxy group such as acetyloxy or benzoyloxy; a $C_{1-20}$, desirably $C_{1-12}$ and more desirably $C_{1-8}$ acyl group such as formyl, acetyl pivaloyl, stearoyl, benzoyl or p-n-octyloxyphenylcarbonyl; and a $C_{2-20}$, desirably $C_{2-13}$ and more desirably $C_{2-9}$ alkoxycarbonyl group such as methoxycarbonyl, ethoxycarbonyl or 2-benzyloxycarbonyl. $C^1$ is desirably selected from a substituted or unsubstituted alkyl group, a substituted or unsubstituted cycloalkyl group or a substituted or unsubstituted alkoxy group, and more desirably selected from propyl, pentyl, heptyl, 4-pentylcyclohexyl or trifluoromethoxy. $C^1$ may carry a substituent, and examples of the substituent are same as those exemplified below as examples of the substituent respectively represented by $R^3$ to $R^6$.

In the formula (a), r is 0 or 1 and n is an integer 1 to 3. r is desirably 0. n is desirably 1 or 2 and more desirably 1.

In the formula (1), $R^7$ and $R^8$ respectively represent an optionally substituted aryl group. Preferred examples of the aryl group include a $C_{6-20}$, desirably $C_{6-15}$ and more desirably $C_{6-10}$ aryl group such as 4-t-butylphenyl, 2-methylphenyl or 2,5-dimethylphenyl. $R^7$ and $R^8$ may carry a substituent respectively, and examples of the substituent are same as those exemplified below as examples of the substituent respectively represented by $R^3$ to $R^6$ Among those, an alkyl group and a halogen atom are preferred and a substituent of $R^7$ or $R^8$.

$R^7$ or $R^8$ is preferably selected from an aryl group substituted with at least one alkyl group.

In the formula (1), $R^4$, $R^5$ and $R^6$ respectively represent a hydrogen atom or a substituent which is selected from a substituent group Y described below.

(Substituent Group Y)

Halogen atom such as chlorine, bromine, iodine or fluorine; a mercapto group, a cyano group, a carboxyl group, a phosphoric acid group, a sulfonic acid group, a hydroxy group, a $C_{1-20}$, desirably $C_{2-12}$ and more desirably $C_{2-8}$ carbamoyl group such as methylcarbamoyl, ethylcarbamoyl or morpholinocarbamoyl; a $C_{0-20}$, desirably $C_{1-12}$ and more desirably $C_{1-8}$ sulfamoyl group such as methylsulfamoyl, ethylsulfamoyl or piperidinosulfamoyl; a nitro group; a $C_{1-20}$, desirably $C_{1-12}$ and more desirably $C_{1-8}$ alkyl group such as methyl, ethyl, propyl, butyl, pentyl, hexyl, heptyl, octyl, cyclohexyl, 4-methylcyclohexyl, 4-ethylcyclohexyl, 4-propylcyclohexyl or 4-butylcyclohexyl; a $C_{1-20}$, desirably $C_{1-12}$ and more desirably $C_{1-8}$ alkoxy group such as methoxy, ethoxy, 2-methoxyethoxy or 2-phenylethoxy; a $C_{6-20}$, desirably $C_{6-12}$ and more desirably $C_{6-10}$ aryloxy group such as phenoxy, p-methylphenoxy, p-chlorophenoxy or naphthoxy; a $C_{1-20}$, desirably $C_{2-12}$ and more desirably $C_{2-8}$ acyl group such as acetyl, benzoyl or trichloroacetyl; a $C_{1-20}$, desirably $C_{2-12}$ and more desirably $C_{2-8}$ acyloxy group such as acetyloxy or benzoyloxy; a $C_{1-20}$, desirably $C_{2-12}$ and more desirably $C_{2-8}$ acylamino group such as acetylamino; a $C_{1-20}$, desirably $C_{1-12}$ and more desirably $C_{1-8}$ sulfonyl group such as methanesulfonyl, ethanesulfonyl or benzenesulfonyl; a $C_{1-20}$, desirably $C_{1-12}$ and more desirably $C_{1-8}$ sulfinyl group such as methanesulfinyl, ethanesulfinyl or benzenesulfinyl; a $C_{1-20}$, desirably $C_{1-12}$ and more desirably $C_{1-8}$ sulfonylamino group such as methanesulfonylamino, ethanesulfonylamino or benzenesulfonylamino; a $C_{0-20}$, desirably $C_{0-12}$ and more desirably $C_{0-8}$ amino group such as unsubstituted amino, methylamino, dimethylamino, benzylamino, anilino or diphenylamino; a $C_{3-18}$, desirably $C_{3-12}$ and more desirably $C_{3-6}$ ammonium group such as trimethylammonium or triethylammonium; a $C_{0-18}$, desirably $C_{1-12}$ and more desirably $C_{1-6}$ hydrazino group such as trimethylhydrazino; a $C_{1-18}$, desirably $C_{1-12}$ and more desirably $C_{1-6}$ ureido group such as unsubstituted ureido or N,N-dimethylureido; a $C_{2-18}$, desirably $C_{2-10}$ and more desirably $C_{2-6}$ imido group such as succinimido; a $C_{1-20}$, desirably $C_{1-12}$ and more desirably $C_{1-8}$ alkylthio group such as methylthio, ethylthio or propylthio; a $C_{6-20}$, desirably $C_{6-15}$ and more desirably $C_{6-10}$ arylthio group such as phenylthio, p-methylphenylthio, p-chlorophenylthio, 2-pyridilethio or naphthylthio; a $C_{2-20}$, desirably $C_{2-12}$ and more desirably $C_{2-8}$ alkoxycarbonyl group such as methoxycarbonyl, ethoxycarbonyl or 2-benzyloxycarbonyl; a $C_{6-20}$, desirably $C_{6-15}$ and more desirably $C_{6-10}$ aryloxycarbonyl group such as phenoxycarbonyl; a $C_{6-20}$, desirably $C_{6-15}$ and more desirably $C_{6-10}$ aryl group such as phenyl, naphthyl, p-carboxyphenyl, p-nitrophenyl 3,5-dichlorophenyl, p-cyanophenyl, m-fluorophenyl or p-tolyl; and a $C_{1-20}$, desirably $C_{2-15}$ and more desirably $C_{2-8}$ substituted or unsubstituted heteroaryl group such as pyridyl, 5-methylpyridyl, thienyl, furyl, morpholino, tetrahydrofurfuryl, quinolyl, thiazolyl, benzothiazolyl, oxazolyl, benzoxazolyl, imidazolyl or benzoimidazolyl.

The rings such as benzene or naphthalene ring included in the substituents exemplified above may be condensed with other rings.

$R^3$, $R^4$, $R^5$ and $R^6$ are desirably selected from a hydrogen atom, a halogen atom, a cyano group, a carboxyl group, an alkoxycarbonyl group, an aryloxycarbonyl group, a carbamoyl group or an aryl group, and more desirably selected from a hydrogen atom, a cyano group, an alkoxycarbonyl group, an aryloxycarbonyl group or a carbamoyl group.

Among the compounds represented by the formula (1), the compounds satisfying all of (1) to (3) described below are preferred:

(1) $R^1$ and $R^2$ respectively represent an optionally substituted aryl group;

(2) $R^3$ to $R^6$ respectively represent a hydrogen atom, a halogen atom, a cyano group, a carboxyl group, an optionally substituted alkoxycarbonyl group, an optionally substituted aryloxycarbonyl group, a carbamoyl group or an optionally substituted aryl group; and (3) $R^7$ and $R^8$ respectively represent an optionally substituted aryl group.

Among the preferred compounds, the compounds satisfying all of (4) to (6) described below are more preferred:

(4) $R^1$ and $R^2$ respectively represent an optionally substituted aryl group;

(5) $R^3$ to $R^6$ respectively represent a hydrogen atom, an optionally substituted aryloxycarbonyl group, a carbamoyl group or an optionally substituted aryl group; and (6) $R^7$ and $R^8$ respectively represent an optionally substituted aryl group.

The compound represented by the formula (1) may be produced by a process comprising using 1,5-dihydroxy-4,8-dinitro anthraquinone as a starting material, and carrying out (i) an anilino-introduction reaction of the starting material while eliminating a nitro group, (ii) a tosylation of a hydroxy group of the product of the (i) reaction, (iii) an anilino-introduction reaction of the product of the (ii) reaction while eliminating a tosyloxy group and (iv) an arylthiolation while eliminating a nitro group or a tosyloxy group of the product of the (iii) reaction.

The anilino-introduction reaction while eliminating a nitro group, the (i) reaction, may be carried out by reacting 1,5-dihydroxy-4,8-dinitro anthraquinone with aniline in a polar solvent under heating. The preferred amount of aniline is from 1 to 3 equivalent weights. Examples of the polar solvent, which can be used in the reaction (i), include dimethylacetamide, dimethylformamide, 1,4-dioxane and diglyme. The reaction temperature is desirably from 80 to 160 degrees Celsius. The reaction time is desirably from 1 to 24 hours.

The tosylation of a hydroxy group, the reaction (ii), may be carried out by reacting 8-anilino-1,5-dihydroxy-4-nitroanthraquinone with tosyl chloride in an organic solvent in the presence of a base. The preferred amount of tosyl chloride is from 2 to 3 equivalent weights. The preferred amount of the base is from 2 to 5 equivalent weights, and preferred examples of the base include, however not to be limited to, sodium hydride, potassium carbonate, potassium t-butoxide, triethylamine and DBU. Examples of the organic solvent, which can be used in the reaction (ii), include, however not to be limited to, chloroform, dichloromethane, tetrahydrofuran, toluene, dimethylacetamide and dimethylformamide. The reaction temperature is desirable from 0 to 80 degrees Celsius. The reaction time is desirably from 1 to 24 hours.

The anilino-introduction reaction while eliminating a tosyl group, the reaction (iii) may be carried out by reacting 8-anilino-4-nitro-1,5-bis(p-toluenesulfonyloxy)anthraquinon e with aniline in a polar solvent under heating. The preferred amount of aniline is from 1 to 3 equivalent weights. Preferred examples of the polar solvent include dimethylacetamide, dimethylformamide, 1,4-dioxane and diglyme. The reaction temperature is desirably from 100 to 180 degrees Celsius. The reaction time is desirably from 1 to 24 hours.

The arylthiolation while eliminating a nitro group and a tosyloxy group, the reaction (iv), may be carried out by reacting 4,5-dianilino-8-nitro-1-(p-toluenesulfonyloxy)anthraquinone with arenethiol and a base in a polar solvent. The preferred amount of arenethiol is from 2 to 3 equivalent weights. The preferred amount of the base is from 2 to 5 equivalent weights. Examples of the base include, however not to be limited to, sodium hydride, potassium carbonate, potassium t-butoxide, triethylamine and DBU. Preferred examples of the polar solvent include dimethylacetamide, dimethylformamide, 1,4-dioxane and diglyme. The reaction temperature is desirably from 0 to 100 degrees Celsius. The reaction time is desirably from 1 to 24 hours.

Examples of the compound represented by the formula (1) include, however not to be limited to, Compound Nos. 1-1 to 1-6 and Compounds Nos. 2-1 to 2-4 shown below. It is to be noted that Compound Nos. 2-1 to 2-4 are examples wherein at least $R^1$ and $R^2$ is the group represented by the formula (a).

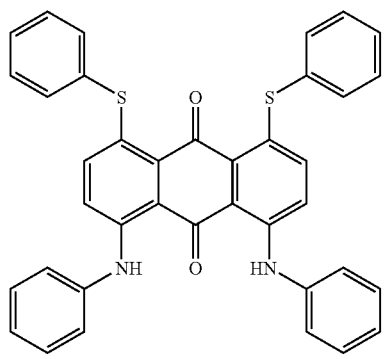

(1-1)

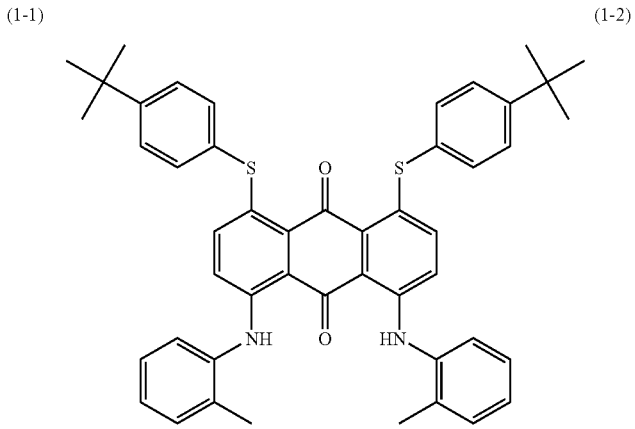

(1-2)

-continued
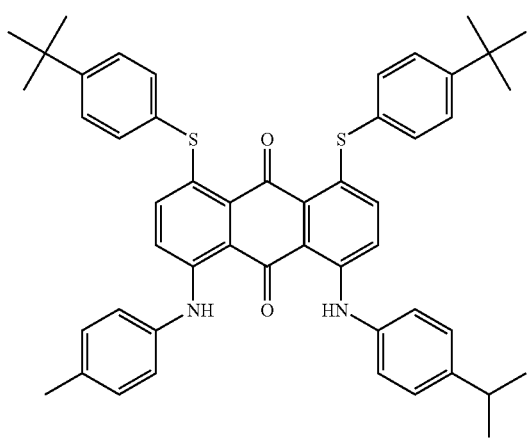
(1-3)
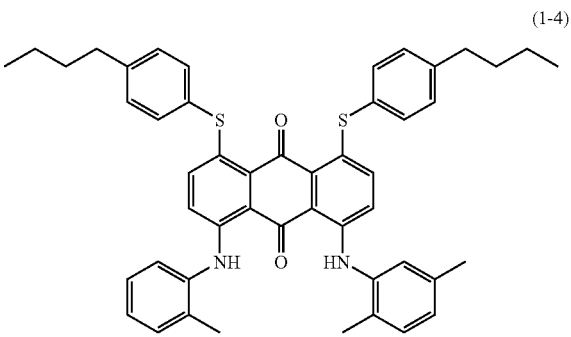
(1-4)
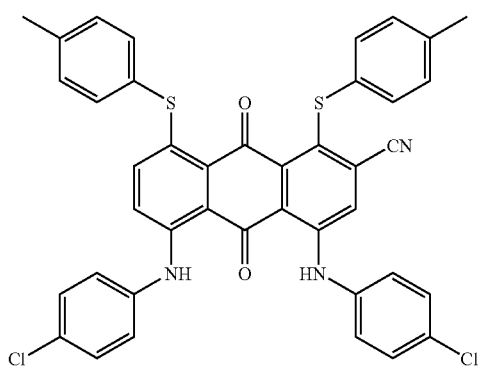
(1-5)
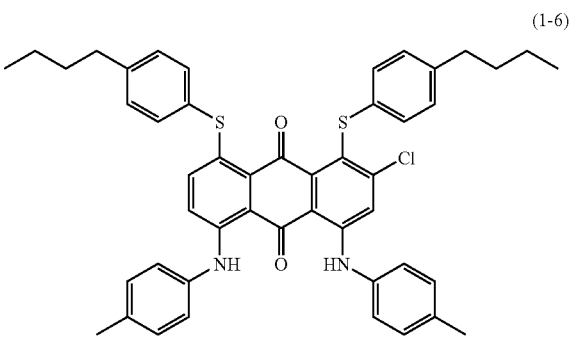
(1-6)
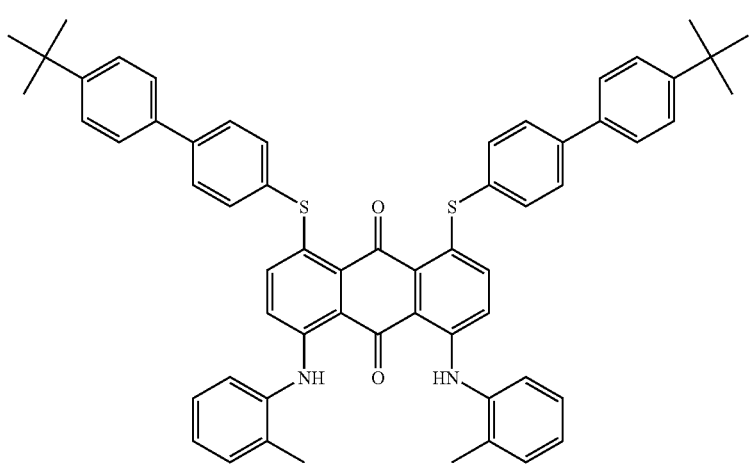
(2-1)

-continued

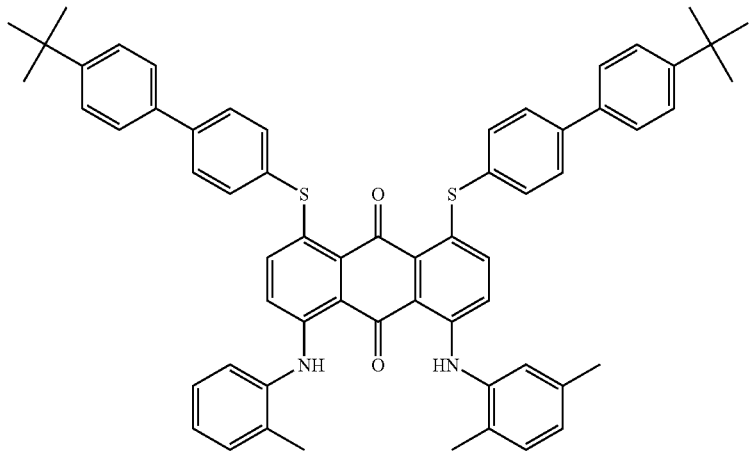
(2-2)

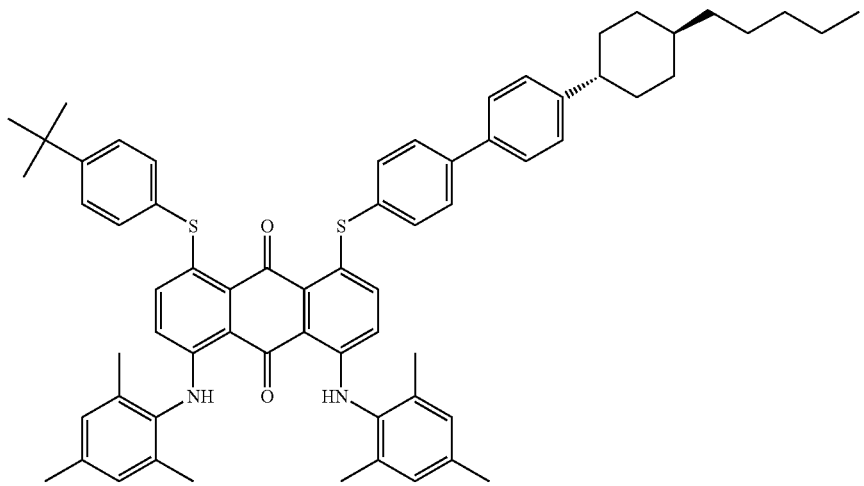
(2-3)

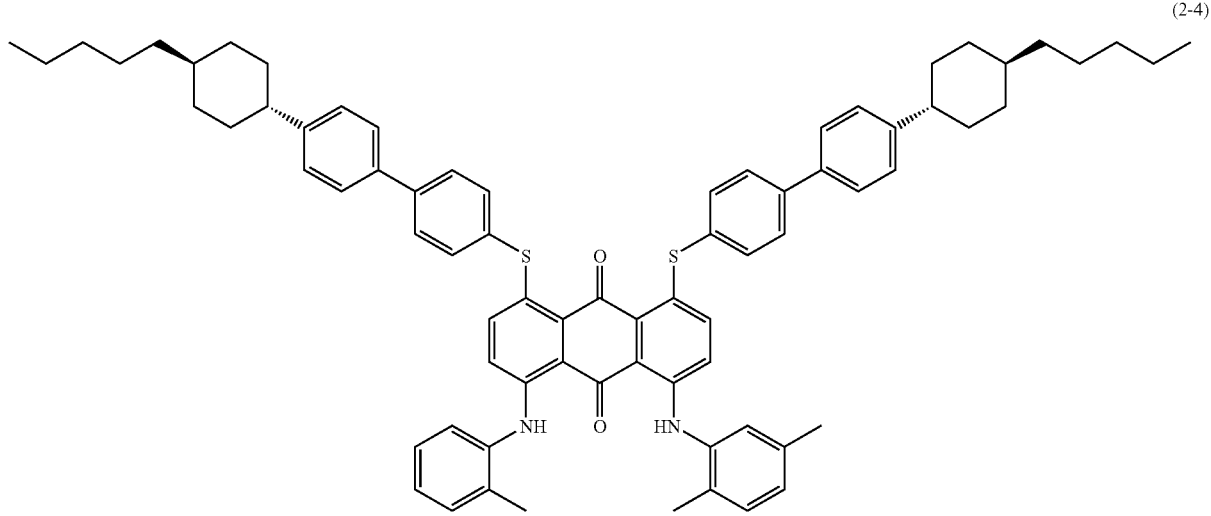
(2-4)

The composition of the present invention comprises at least one dye which is selected from the compounds represented by the formula (1). The dyes represented by the formula (1) may be used alone or in combination. The dyes represented by the formula (1) may be used in combination with any known dichroic dye. Mixtures of plural dichroic dyes are preferably used if it is required to absorb over the whole visible wavelengths for displaying black.

The composition of the present invention comprises host liquid crystal. According to the present invention, any liquid crystal can be used as host liquid crystal providing it can coexist with the dye of the present invention. The host liquid crystal may be selected from liquid crystal compounds exhibiting a nematic phase or a smectic phase. Examples of the host liquid crystal, which can be used in the present invention, include azomethine compounds, cyanobiphenyl compounds, cyanophenyl esters, fluorine-substituted phenyl esters, cyclohexane carboxylic acid phenyl esters, fluorine-substituted cyclohexane carboxylic acid phenyl esters, cyanophenyl-cyclohexanes, fluorine-substituted phenyl-cyclohexanes, cyano-substituted phenyl pyrimidines, fluorine-substituted phenyl pyrimidines, alkoxy-substituted phenyl pyrimidines, fluorine-alkoxy-substituted phenyl pyrimidines, phenyl dioxanes, tolans(diphenylacetylenes), fluorine-substituted tolans(fluorine-substituted diphenylacetylenes) and alkenyl cyclohexyl benzonitriles. Any fluorine-substituted host liquid crystal suitable for TFT drive can be used. In order to obtain desired properties, two or more kinds of liquid crystal may be mixed. In order to adjust the temperature range of mesophase or the voltage response, two or more kinds of liquid crystal may be mixed.

The composition of the present invention may comprise a non-liquid-crystalline compound which can contribute to change any property of a host liquid crystal, such as change the temperature range which host liquid crystal can keep liquid crystal phase. The composition of the present invention may comprise other additives such as a chiral compound, ultra violet absorbent, antioxidant or the like. Examples of such additive include chiral compounds usually used for TN or STN mode.

The amount of the dye in the composition of the present invention is desirably from 0.1 to 15 wt % and more desirably from 0.5 to 6 wt % with respect to the amount of host liquid crystal.

The dye of the present invention may be dissolved in host liquid crystal by mechanical stirring, heating, ultrasonic sound or any combination thereof.

The present invention also relates to a liquid crystal device, especially liquid crystal display device, comprising a pair of substrates and the composition of the present invention disposed between the substrates. The substrate may be selected from glass or plastic substrates. Examples of the plastic substrate include substrates formed of acrylic polymers, polycarbonates or epoxy polymers. The substrates may have an electrode, desirably transparent, layer. The electrode layer may be formed of indium oxide, indium tin oxide or tin oxide or the like.

The substrates desirably have an alignment layer, which is alignment-treated to contribute to aligning host liquid crystal, on surfaces thereof facing the composition of the present invention. The alignment layer may be produced by applying a solution of a quaternary ammonium salt to the surface of the substrate, applying a solution of polyimide to form a polyimide layer and rubbing a surface of the polyimide layer or depositing $SiO_x$ in an oblique direction. The alignment layer can also be produced by utilizing photoisomerization induced by light irradiation.

The liquid crystal device may be produced by disposing a pair of substrates such that they face each other at 1 to 50 μm interval with a spacer or the like and filing the space between the substrates with the composition of the present invention.

The liquid crystal device may be driven by a passive matrix driven system or an active matrix driven system employing a thin-film transistor (TFT).

The liquid crystal device may be applied to liquid crystal displays. The liquid crystal displays employing the device of the present invention can utilize any orientation state of the liquid crystal such as (i) homogenous alignment, (ii) homeotropic alignment, (iii) twist alignment, (iv) hybrid alignment, (v) random alignment or the like.

The liquid crystal display may employ any mode such as (i) Heilmeir type GH mode, (ii) Quarter wave plate type GH mode, (iii) Two layers type GH mode, (iv) Phase translation (White-Taylor) type GH mode, (v) Polymer dispersion liquid crystal (PDLC) type GH mode and (vi) Ferroelectric GH mode.

EXAMPLES

The following examples further illustrate the present invention. The materials, reagents, amounts and proportions thereof, procedures or the like shown in the following examples can be appropriately changed without departing from the spirit of the present invention. Therefore, the scope of the present invention is not limited to the specific examples shown below.

Example 1

Synthesis of Compound No. 1-3

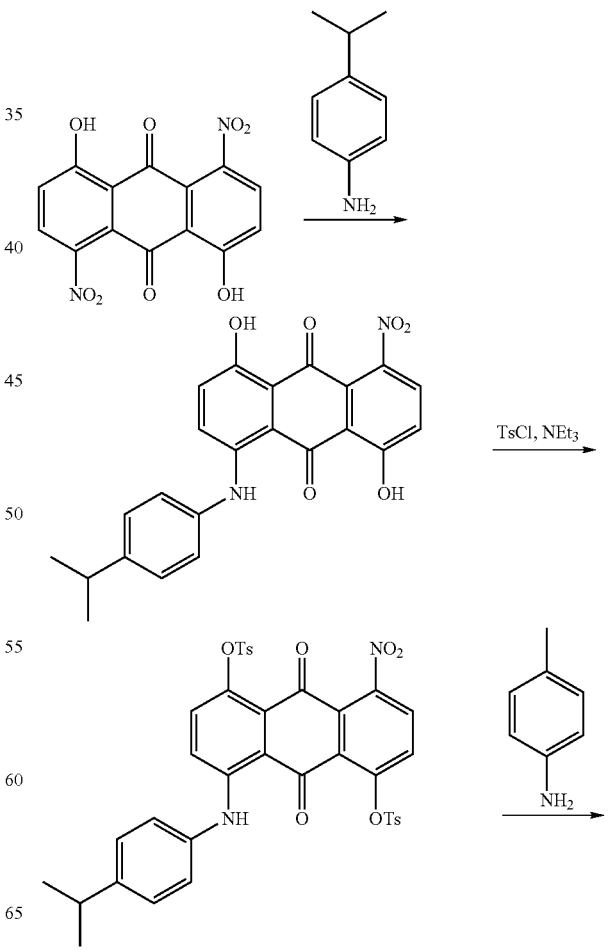

-continued

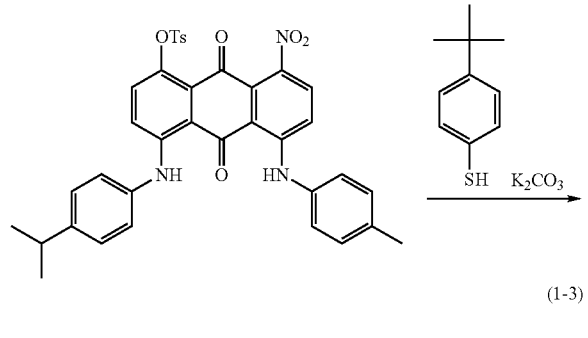

(1-3)

A solution was prepared by mixing 1.0 g of 1,5-dihydroxy-4,8-dinitroanthraquinone, 1.6 g of 4-isopropyl aniline and 20 ml of dimethylacetamide was heated and allowed to react for 4 hours at inner temperature of 140 degrees Celsius. The reaction solution was cooled, and extracted with adequate amounts of ethyl acetate and 1N hydrochloric acid to separate into two layers. The extracted organic layer was dried with magnesium sulfate and concentrated. The obtained product was purified by silica gel chromatography to give 1.2 g of 8-(4'-isopropylanilino)-1,5-dihidroxy-4-nitro anthraquinone in a yield of 95%.

A 1.2 g of 8-(4'-isopropylanilino)-1,5-dihydroxy-4-nitroanthraquinone and a 1.4 g of tosyl chloride were dissolved in 20 ml of dichloromethane, and a 1.0 ml of trimethylamine was added to the solution and allowed to react for 12 hours at room temperature under stirring. The reaction solution was extracted with adequate amounts of ethyl acetate and 1N-hydrochloric acid to separate into two layers. The extracted organic layer was dried with magnesium sulfate and concentrated. The obtained product was purified by silica gel chromatography to give a 2.0 g of 8-(4'-isopropylanilino)-4-nitro-1,5-bis(p-toluenesulfonyloxy)anthraquinone in a 94% yield.

A 2.0 g of 8-(4'-isopropylanilino)-4-nitro-1,5-bis(p-toluenesulfonyloxy)anthraquinone and a 0.74 g of 4-methylaniline were dissolved in 20 ml of 1,4-dioxane, and the solution was refluxed and allowed to react for 10 hours under heating. After the reaction solution was concentrated, ethyl acetate and ethanol were added to the solution, and then a 1.7 g of 4-(4'-isopropylanilino)-5-(4'-methylanilino)-8-nitro-1-(p-toluenesulfonyloxy)anthraquinone crystallized in a 93% yield.

A 0.5 g of 4-(4'-isopropylanilino)-5-(4'-methylanilino)-8-nitro-1-(p-toluenesulfonyloxy)anthraquinone, a 0.6 g of 4-t-butylbenzenthiol and a 0.6 g of potassium carbonate were dissolved in 10 ml of dimethylformamide and allowed to react at room temperature for 8 hours. The reaction solution was extracted with adequate amounts of ethyl acetate and 1N-hydrochloric acid to separate into two layers. The extracted organic layer was dried with magnesium sulfate and then concentrated. The concentrated solution was purified by silica gel chromatography to give a 0.42 g of Compound No. 1-3 in a 71% yield. The properties of the obtained compound were shown below.

$^1$H-NMR(CDCl$_3$): d=1.27 (6H, d, J=6.9 Hz), 1.38 (18H, s), 2.36 (3H, s), 2.92 (1H, m), 6.92 (1H, d, 4.1 Hz), 6.95 (1H, d, 3.9 Hz), 7.1-7.3 (10H, m), 7.45 (4H, d, 8.4 Hz), 7.56 (4H, d, 8.4 Hz), 11.49 (1H, s), 11.51 (1H, s).

Peak absorption wavelength: 656 [nm] (in chloroform).

Molar absorption coefficient: 22900 [l·mol$^{-1}$·cm$^{-1}$].

Example 2

Synthesis of Compound No. 2-1

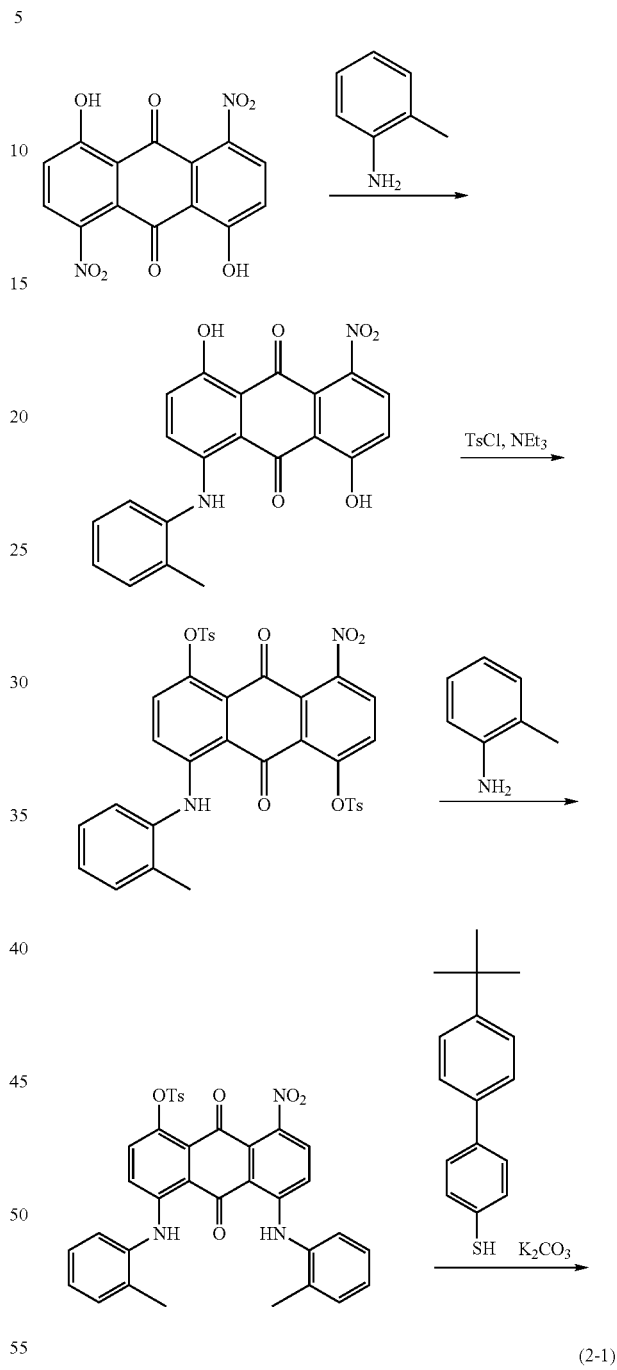

(2-1)

A 25 g of 1,5-dihydroxy-4,8-dinitroanthraquinone and a 25 g of 2-methylaniline were dissolved in 250 ml of dimethylacetamide. The solution was heated and allowed to react at an inner temperature of 140 degrees Celsius for 4 hours. The reaction solution was cooled, and then extracted with adequate amounts of ethyl acetate and 1N-hydrochrolic acid to separate into two layers. The extracted organic layer was dried with magnesium sulfate and then concentrated. The concentrated solution was purified by silica gel chromatography to give a 9.7 g of 8-(2'-methylanilino)-1,5-dihydroxy-4-nitroanthraquinone in a 33% yield.

A 9.5 g of 8-(2'-methylanilino)-1,5-dihydroxy-4-nitroanthraquinone and a 11.6 g of tosyl chloride were dissolved in 200 ml of dichloromethane, and a 8.5 ml of trimethylamine was added to the solution and allowed to react for 12 hours at room temperature under stirring. The reaction solution was extracted with adequate amounts of ethyl acetate and 1N-hydrochloric acid to separate into two layers. The extracted organic layer was dried with magnesium sulfate and then concentrated. The concentrated solution was purified by silica gel chromatography to give 15.2 g of 8-(4'-methylanilino)-4-nitoro-1,5-bis(p-toluenesulfonyloxy)anthraquinone in a 90% yield.

A 5.0 g of 8-(4'-mehtylanilino)-4-nitoro-1,5-bis(p-toluenesulfonyloxy)anthraquinone and a 1.5 g of 2-methylaniline were dissolved in 50 ml of dimethylacetamide. The solution was heated and allowed to react at an inner temperature of 120 degrees Celsius for 5 hours. The reaction solution was cooled, and then extracted with adequate amounts of ethyl acetate and 1N-hydrochloric acid to separate into two layers. The extracted organic layer was dried with magnesium sulfate and then concentrated. The concentrated solution was purified by silica gel chromatography to give a 2.9 g of 4,5-bis(2'-methylanilino)-8-nitro-1-(p-toluenesulfonyloxy)anthraquinone in a 64% yield.

A 1.0 g of 4,5-bis(2'-methylanilino)-8-nitro-1-(p-toluenesulfonyloxy)anthraquinone, a 1.2 g of 4-(4'-t-butylphenyl)thiophenol and a 1.2 g of potassium carbonate were dissolved in 20 ml dimethylformamide and allowed to react at room temperature for 8 hours. The reaction solution was extracted with adequate amounts of ethyl acetate and 1N-hydrochloric acid to separate into two layers. The extracted organic layer was dried with magnesium sulfate and then concentrated. The concentrated solution was purified by silica gel chromatography to give a 1.1 g of Compound No. 2-1 in a 77% yield. Some properties of the obtained compound are shown below.

$^1$H-NMR(CDCl$_3$):d=1.37 (18H, s), 2.31 (6H, s) 7.00 (4H, s), 7.10 (2H, td, 7.4 Hz, 1.6 Hz), 7.12 (2H, td, 7.4 Hz, 1.4 Hz), 7.24-7.32 (4H, m), 7.48 (4H, d, 8.5 Hz), 7.56 (4H, d, 8.5 Hz), 7.64 (4H, d, 8.5 Hz), 11.42 (2H, s).

Peak absorption wavelength: 649 [nm] (in chloroform).
Molar absorption coefficient: 22300 [l·mol$^{-1}$·cm$^{-1}$].

Example 3

Synthesis of Compound No. 2-2

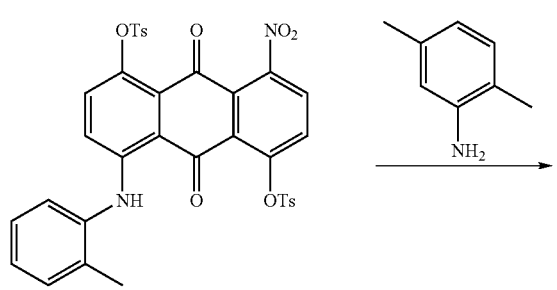

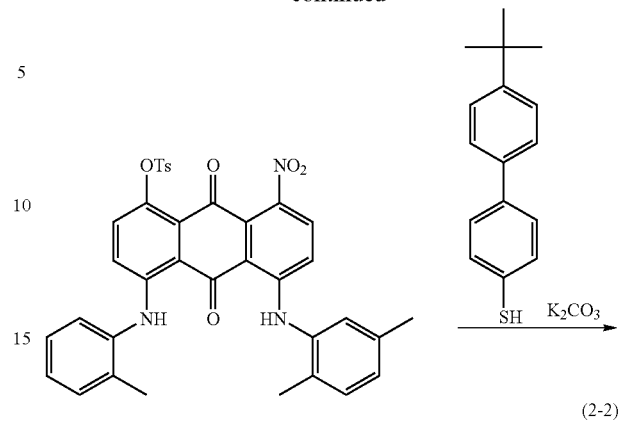

(2-2)

A 5.0 g of 8-(4'-methylanilino)-4-nitro-1,5-bis(p-toluenesulfonyloxy)anthraquinone and a 1.5 g of 2,5-dimethylaniline were dissolved in 50 ml of dimethylacetamide. The solution was heated and allowed to react at an inner temperature of 120 degrees Celsius for 5 hours. The reaction solution was cooled and then extracted with adequate amounts of ethyl acetate and 1N-hydrochloric acid to separate into two layers. The extracted organic layer was dried with magnesium sulfate and then concentrated. The concentrated solution was purified by silica gel chromatography to give a 2.6 g of 5-(2',5'-dimethylanilino)-4-(2'-methylanilino)-8-nitoro-1-(p-toluenesulfonyloxy)anthraquinone in a 56% yield.

A 1.0 g of 5-(2',5'-dimethylanilino)-4-(2'-methylanilino)-8-nitro-1-(p-toluenesulfonyloxy)anthraquinone and a 1.2 g of 4-(4'-t-butylphenyl)thiophenol and a 1.2 g of potassium carbonate were dissolved in 20 ml of dimethylformamide and allowed to react at room temperature for 8 hours. The reaction solution was extracted with adequate amounts of ethyl acetate and 1N-hydrochloric acid to separate into two layers. The extracted organic layer was dried with magnesium sulfate and then concentrated. The concentrated solution was purified by silica gel chromatography to give a 0.6 g of Compound No. 2-2 in a 43% yield. Some properties of the compound are shown below.

$^1$H-NMR(CDCl$_3$) d=1.37 (18H, s), 2.25 (3H, s), 2.29 (3H, s), 2.31 (3H, s), 6.90-7.30 (11H, m), 7.48 (4H, d, 8.4 Hz), 7.56 (4H, 8.4 Hz), 7.62 (4H, 8.3 Hz), 7.66 (4H, 8.3 Hz), 11.37 (1H, s), 11.42 (1H, s).

Peak absorption wavelength: 646 [nm] (in chloroform).
Molar absorption coefficient: 22700 [l·mol$^{-1}$·cm$^{-1}$].

Example 4

Evaluations of Order Parameters and Absorption Properties

A 3.0 g of each compound shown in Table 1 was dissolved in a 100 mg of "ZLI-1132" (trade name, manufactured by E.Merck) under heating, and the obtained solution was left for overnight to give a liquid crystal composition. The composition was poured into a liquid crystal cell to prepare a guest host liquid crystal device. The cell used was a liquid crystal cell commercially produced by E.H.C., consists of a pair of a glass substrates having a thickness of 0.7 mm, being disposed such that they faced each other at 8 μm interval and being sealed with epoxy resin; a pair of ITO electrodes each thereon; and a pair of alignment layers formed of polyimide, being rubbed along a parallel alignment at a facing surface respectively. The produced liquid crystal device was irradiated with polarized lights parallel or perpendicular to the rubbed direction respectively, and the absorption spectra (A∥ and A⊥) were measured by Shimazu UV3100 respectively. An order parameter (S) was calculated by a formula 1 shown bellow with a value of A∥ and A⊥ at a peak absorption wavelength.

$$S = (A_\parallel - A_\perp)/(A_\parallel + 2 \times A_\perp)$$  Formula 1

The order parameter (s) and the peak absorption wavelength (λmax) of each sample are shown in Table 1. The standardized absorption wave profile is shown in FIG. 1.

TABLE 1

| Compound No. | S | λ max | Note |
|---|---|---|---|
| 1-3 | 0.54 | 665 | Invention |
| 2-1 | 0.65 | 655 | Invention |
| 2-2 | 0.67 | 654 | Invention |
| 2-4 | 0.73 | 650 | Invention |
| A-1 | 0.68 | 611 | Comparative Example |

Comparative Compound (A-1)

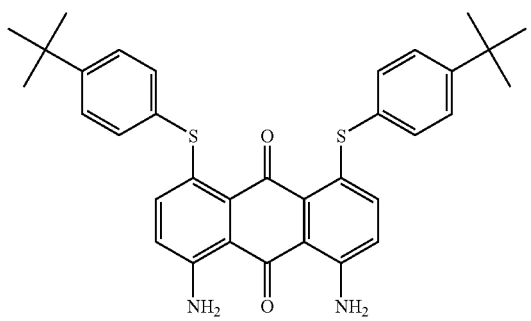

From the results shown in Table 1 or FIG. 1, it can be understood that the devices employing the compositions of the present invention, which respectively comprises a dye represented by the formula (1), having a long and proper λmax as a cyan dye, deliver superior color reproduction area to the device employing known comparative dye No. A-1.

According to the present invention, it is possible to provide a liquid crystal composition, comprising an anthraquinone-type dye exhibiting both of a high order parameter and a proper absorption property, capable of delivering high contrast display; a liquid crystal device capable of delivering high contrast displaying; and compounds useful as a dichroic dye.

What is claimed is:

1. A composition comprising at least one liquid crystal and at least one compound represented by a formula (1):

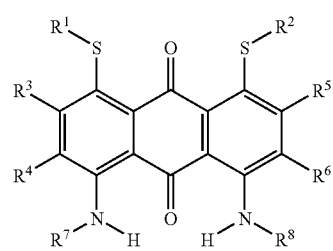

Formula (1)

wherein $R^1$ and $R^2$ respectively represent an optionally substituted aryl group or an optionally substituted heteroaryl group; $R^7$ and $R^8$ respectively represent an optionally substituted aryl group; $R^3$, $R^4$, $R^5$ and $R^6$ respectively represent a hydrogen atom or a substituent; and at least one of $R^1$ and $R^2$ is a group represented by a formula (a):

$$-(B^1)-\{(Q)_r-(B^2)\}_n-C^1 \qquad \text{Formula (a)}$$

wherein $B^1$ and $B^2$ respectively represent an optionally substituted arylene group or an optionally substituted heteroarylene group: Q is a divalent linking group: $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group: r is 0 or 1; n is an integer of 1 to 3; and two of Q or two of $B^2$ may be identical to or different from each other when n is 2 or 3.

2. The composition of claim 1, wherein r is 0 and n is 1.

3. The composition of claim 1, wherein $B^1$ and $B^2$ respectively represent an arylene group, and $C^1$ represents an optionally substituted alkyl group, an optionally substituted cycloalkyl group or an optionally substituted alkoxy group.

4. The composition of claim 1, wherein both of $R^1$ and $R^2$ are respectively selected from the group represented by the formula (a).

5. The composition of claim 1, wherein $R^3$ to $R^6$ respectively represent a hydrogen atom, a halogen atom, a cyano group, a carboxyl group, an optionally substituted alkoxycarbonyl group, an optionally substituted aryloxycarbonyl group, a carbamoyl group or an optionally substituted aryl group; and $R^7$ and $R^8$ respectively represent an optionally substituted aryl group.

6. The composition of claim 1, wherein $R^3$ to $R^6$ respectively represent a hydrogen atom, an optionally substituted aryloxycarbonyl group, a carbamoyl group or an optionally substituted aryl group; and $R^7$ and $R^8$ respectively represent an optionally substituted aryl group.

7. The composition of claim 1, wherein $R^7$ and $R^8$ respectively represent an aryl group substituted with at least one alkyl group.

8. A liquid crystal device comprising a pair of electrodes and a liquid crystal layer disposed between the electrodes wherein the liquid crystal layer comprises a composition comprising at least one liquid crystal and at least one compound represented by a formula (1):

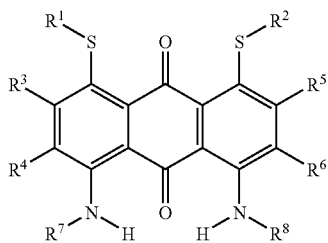

Formula (1)

wherein $R^1$ and $R^2$ respectively represent an optionally substituted aryl group or an optionally substituted heteroaryl group; $R^7$ and $R^8$ respectively represent an optionally substituted aryl group; $R^3$, $R^4$, $R^5$ and $R^6$ respectively represent a hydrogen atom or a substituent; and at least one of $R^1$ and $R^2$ is a group represented by a formula (a):

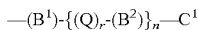

Formula (a)

wherein $B^1$ and $B^2$ respectively represent an optionally substituted arylene group or an optionally substituted heteroarylene group; Q is a divalent linking group; $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group: r is 0 or 1; n is an integer of 1 to 3; and two of Q or two of $B^2$ may be identical to or different from each other when n is 2 or 3.

9. A compound represented by a formula (2):

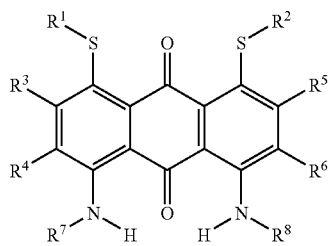

Formula (2)

wherein $R^1$ and $R^2$ respectively represent an optionally substituted aryl group or an optionally substituted heteroaryl group; $R^7$ and $R^8$ respectively represent an optionally substituted aryl group; $R^3$, $R^4$, $R^5$ and $R^6$ respectively represent a hydrogen atom or a substituent and at least one of $R^1$ and $R^2$ is a group represented by a formula (a):

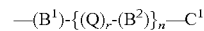

Formula (a)

wherein $B^1$ and 2 respectively represent an optionally substituted arylene group or an optionally substituted heteroarylene group; Q is a divalent linking group; $C^1$ is an optionally substituted alkyl group, an optionally substituted cycloalkyl group, an optionally substituted alkoxy group, an optionally substituted alkoxycarbonyl group, an optionally substituted acyl group or an optionally substituted acyloxy group; r is 0 or 1; n is an integer of 1 to 3; and two of Q or two of $B^2$ may be identical to or different from each other when n is 2 or 3.

10. The compound of claim 9, wherein r is 0 and n is 1.

11. The compound of claim 9, wherein $B^1$ and $B^2$ respectively represent an optionally substituted arylene group, and $C^1$ represents an optionally substituted alkyl group, an optionally substituted cycloalkyl group or an optionally substituted alkoxy group.

12. The compound of claim 9, wherein both of $R^1$ and $R^2$ are respectively selected from the group represented by the formula (a).

13. The compound of claim 9, wherein $R^3$ to $R^6$ respectively represent a hydrogen atom, a halogen atom, a cyano group, a carboxyl group, an optionally substituted alkoxycarbonyl group, an optionally substituted aryloxycarbonyl group, a carbamoyl group or an optionally substituted aryl group; and $R^7$ and $R^8$ respectively represent an optionally substituted aryl group.

14. The compound of claim 9, wherein $R^3$ to $R^6$ respectively represent a hydrogen atom, an optionally substituted aryloxycarbonyl group, a carbamoyl group or an optionally substituted aryl group; and $R^7$ and $R^8$ respectively represent an optionally substituted aryl group.

* * * * *